United States Patent [19]
Kaneko et al.

[11] 3,944,930
[45] Mar. 16, 1976

[54] AUTOMATIC CHANGE-OVER NOTIFICATION FOR A RECEIVER

[75] Inventors: Masayasu Kaneko, Tokyo; Syunji Ohshima, Yokohama; Yasuaki Asanuma, Tokyo, all of Japan

[73] Assignee: Sony Corporation, Tokyo, Japan

[22] Filed: Sept. 23, 1974

[21] Appl. No.: 508,687

[30] Foreign Application Priority Data
Sept. 22, 1973 Japan.............................. 48-107232
Sept. 29, 1973 Japan.............................. 48-109648

[52] U.S. Cl. .................... 325/364; 325/21; 325/64; 325/397
[51] Int. Cl.² ............................................ H04B 1/40
[58] Field of Search ............. 325/15, 21, 22, 64, 57, 325/390, 392, 364, 397, 399, 389

[56] References Cited
UNITED STATES PATENTS

| | | | |
|---|---|---|---|
| 2,510,316 | 6/1950 | Marlowe............................... | 325/64 |
| 2,923,862 | 2/1960 | Teich................................... | 325/392 |
| 3,317,841 | 5/1967 | Umanoff............................... | 325/64 |
| 3,626,296 | 12/1971 | van der Veen....................... | 325/364 |

*Primary Examiner*—George H. Libman
*Attorney, Agent, or Firm*—Hill, Gross, Simpson, Van Santen, Steadman, Chiara & Simpson

[57] ABSTRACT

Circuits for use with a receiver which notify the operator of a receiving station by means of an audio tone when an opposite station is calling or has ceased transmission. The transition of an opposite station from its transmitting to receiving state or vice versa is detected and a specific change-over sound based upon the detector output is introduced into the principal station's receiver audio amplifier circuits.

10 Claims, 17 Drawing Figures

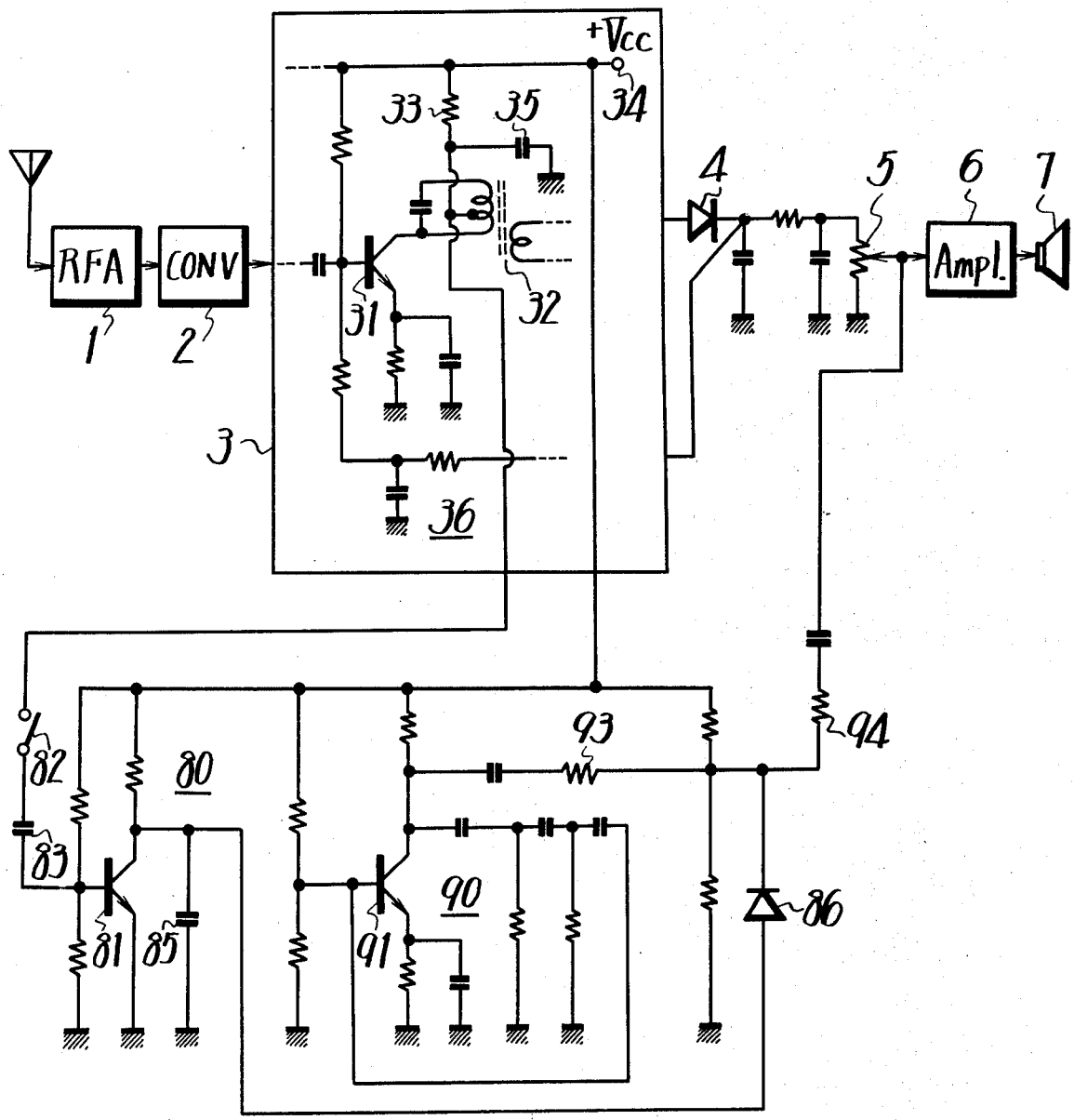

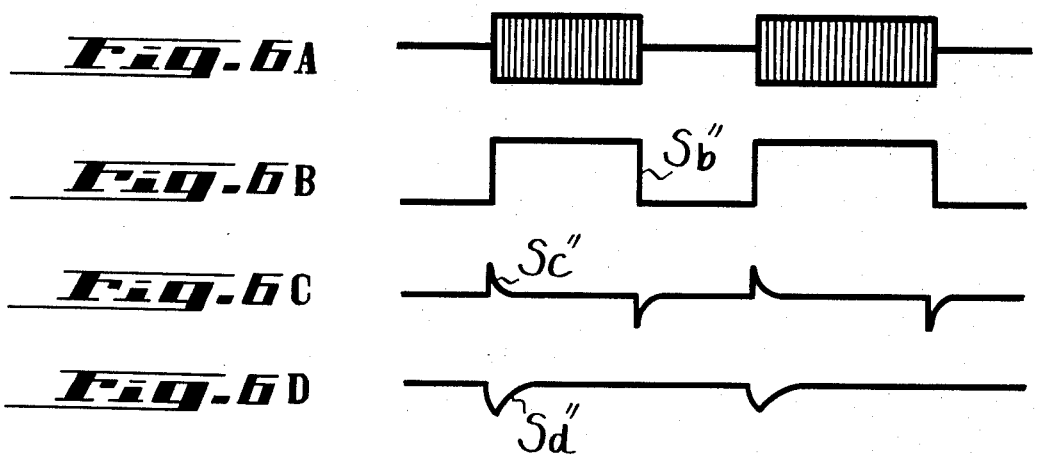
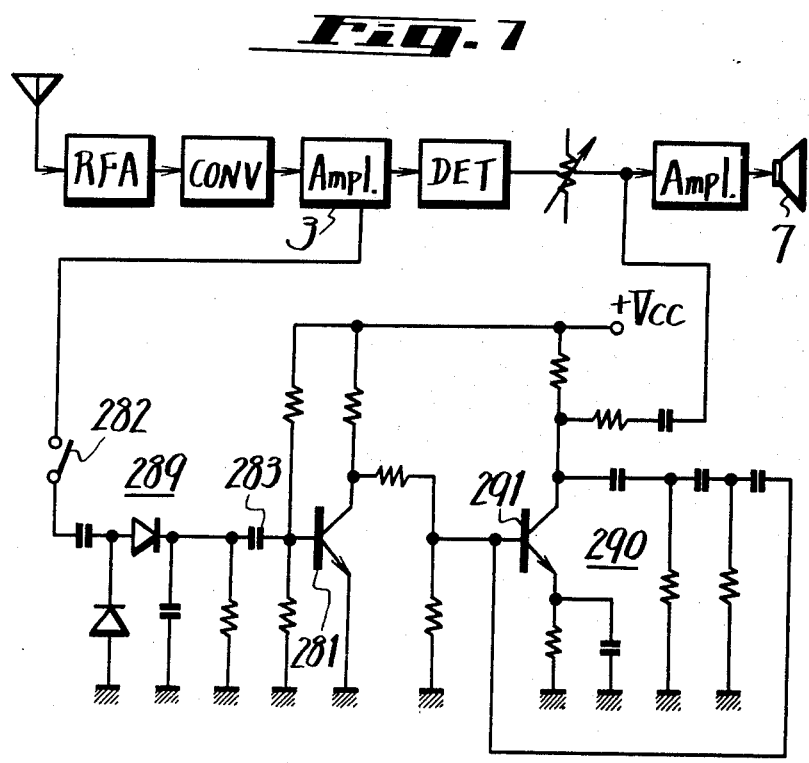

AUTOMATIC CHANGE-OVER NOTIFICATION FOR A RECEIVER

BACKGROUND OF THE INVENTION

1. Field of the Invention

The present invention relates generally to a receiver, and particularly to a receiver provided with a circuit in which the change-over between transmitting and receiving states of an opposite station can be easily recognized.

2. Description of the Prior Art

In the case of performing intercommunication by a transmitter and receiver combination, when the transmitting state is changed-over to the receiving state, it is necessary to say, for example, "Go-ahead, please" for maintenance of good timing in the transition of the transmitting and receiving states between a principal station and its opposite station. However, it is troublesome to say Go-ahead, please every time the transmitting state is changed-over to the receiving state. Likewise, when an opposite station is calling a principal station, it is inconvenient to say, for example, "We are on the air, do you hear us?"

Accordingly, it would be desirable when the transmitting state is switched to the receiving state, that a specific change-over sound would be automatically transmitted thereby to inform the principal station that the opposite station has been changed-over from the transmitting state to the receiving state. However, the transmission of such a specific oscillating sound may be legally prohibited in a field of simple radio service, so that any means for instructing the change-over has not been provided in the prior art transmitter and receiver. Hence, an arrangement which produces a change-over sound dependent upon the presence of a signal carrier without the transmission of a change-over signal at the beginning or end of transmission would be highly useful.

SUMMARY OF THE INVENTION

An object of this invention is to provide an improved transceiver.

More specifically, an object of this invention is to provide a receiver which is capable of recognizing the termination or initiation of transmission without any change-over sound signal being transmitted from the opposite station or appropriate notification such as Go ahead, please or We are on the air, do you hear us.

A further object of this invention is to provide a receiver in which a change-over sound signal is produced in the receiving station every time when the opposite station begins or ends a transmission so that the change-over between transmitting and receiving states can be smoothly performed.

Another object of this invention is to provide a receiver with a simple, low-cost circuit construction for detecting the presence of an opposite station signal in accordance with the automatic gain control level and to introduce an appropriate change-over signal from the output of an oscillator into the receiving system of the principal station.

According to one embodiment of the invention, a received signal creates a receiver reverse AGC voltage which sets the operating level of an IF amplifier. The change from a high to a low IF amplifier operating level corresponding to the termination of a received signal is differentiated to create a peaked waveform of negative direction which decreases the current flow in a normally "ON" transistor commonemitter amplifier. The resulting rise in collector voltage permits an interconnected RC oscillator which is normally biased "OFF" to begin oscillating. The oscillator signal is introduced into the receiver audio chain and a brief tone is produced corresponding to the termination of the received signal from the opposite station. An additional advantage associated with the above embodiment is a relationship between the duration of the change-over sound tone and the strength of the received signal, the shorter sound durations corresponding to weaker signals and smaller AGC level shifts.

Other embodiments of the invention with a similar operating principal include a system for use with a positive AGC, a system for creation of a change-over signal at the initiation of a received signal for calling purposes, and an arrangement for simple incorporation into a transceiver of a system with a change-over signal for termination of a received signal.

The other objects, features and advantages of the present invention will be apparent from the following description taken in conjunction with the accompanying drawing.

BRIEF DESCRIPTION OF THE DRAWINGS

FIG. 3 is a circuit diagram showing a receiver according to a second embodiment of this invention;

FIGS. 6A to 6D are views of waveforms appearing at the respective parts of the circuit shown in FIG. 5; and FIG. 7 is a circuit diagram showing a receiver according to a fourth embodiment of this invention.

DESCRIPTION OF THE PREFERRED EMBODIMENTS

In the following embodiments presented, only the receiving portion of a transmitter-receiver combination is described. The transmitter portion of the principal station and the transmitter portion at the opposite station can be constructed in the same manner as the prior art. It should be further obvious to one skilled in the art that the transmitters and receivers described herein could each be replaced with a transceiver.

Figure 1:
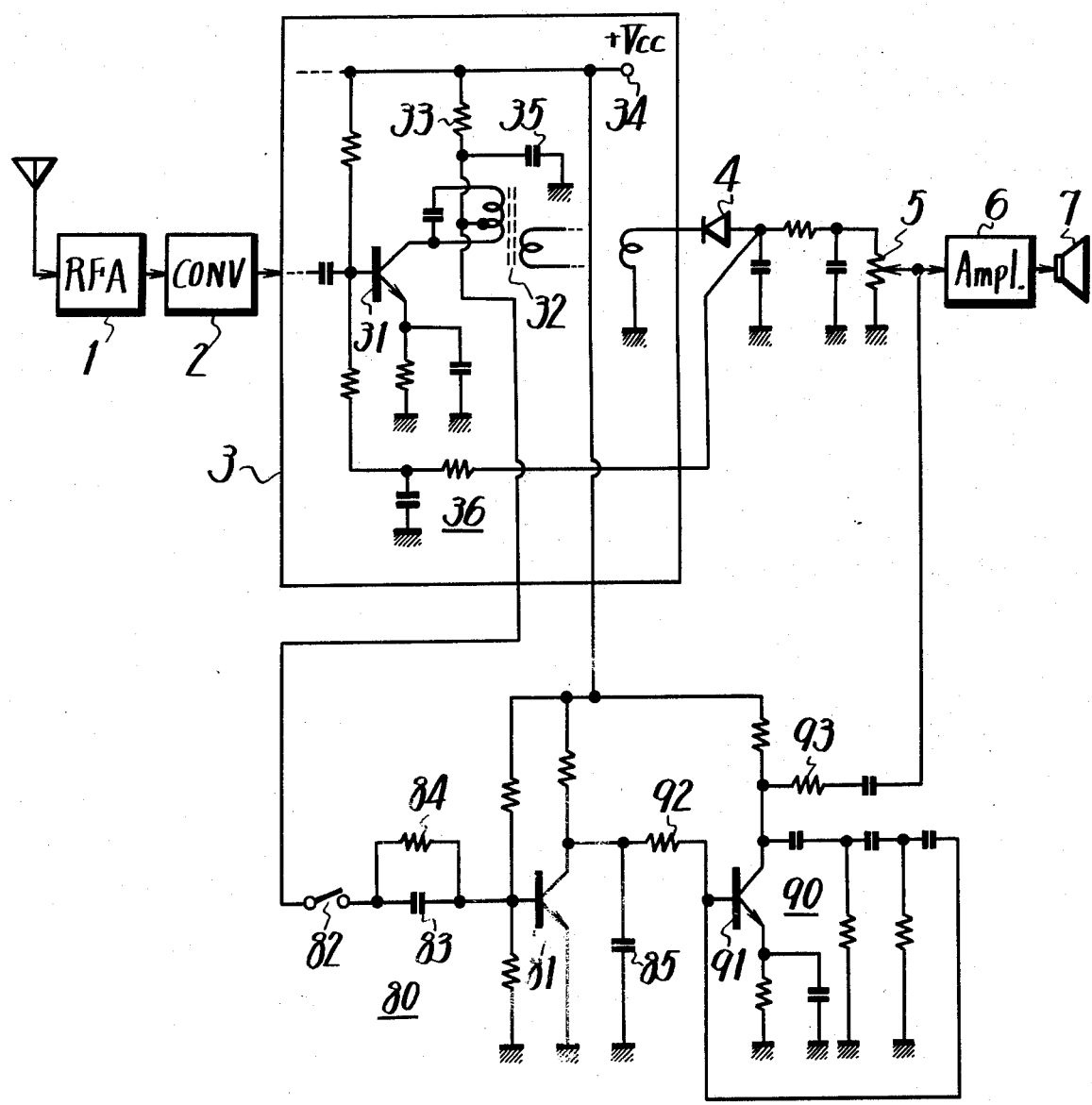
FIG. 1 is a circuit diagram showing a receiver according to a first embodiment of this invention.

A first embodiment of the invention is shown in FIG. 1. Reference numeral 1 designates a radio frequency or RF amplifier, 2 a frequency converter, 3 an intermediate frequency or IF amplifier, 4 a detecting diode, 5 a volume adjusting variable resistor, 6 an audio frequency or AF amplifier, and 7 a speaker. In this example, a signal for reverse automatic gain control (AGC) is applied to the IF amplifier 3. That is, a collector of an IF amplifying transistor 31 in the IF amplifier 3 is connected through a primary winding of an IF transformer 32 and a resistor 33 to a voltage source terminal 34 to which a positive voltage $+V_{cc}$ is applied, and the junction between the primary winding of the transformer 32 and the resistor 33 is grounded through a bypass capacitor 35. With the above arrangement, the diode 4 has derived therefrom a detected output which is applied through a low-pass filter 36 to the base of the transistor 31 as a DC voltage for reverse AGC.

In a detector circuit 80 for detecting an opposite station change-over from its transmitting state to its receiving state, there is provided a grounded-emitter transistor 81, the base of which is connected through a parallel connection of a differentiating capacitor 83 and a resistor 84 and further through a function switch 82 to the connection point between the primary winding of the transformer 32 and the resistor 33, and the collector of which is grounded through an integrating capacitor 85. In addition, an RC oscillator circuit 90 is formed by a transistor 91 as an oscillator for producing a brief changeover sound signal when the transmitting state is switched to the receiving state in the opposite station. The collector of the transistor 81 is connected through a resistor 92 to the base of the transistor 91 and the collector of the transistor 91 is connected through a resistor 93 to a movable contact of the variable resistor 5. In this case, when no signal is present, the transistor 81 is biased in conduction while the transistor 91 is cut off.

Figure 2A:
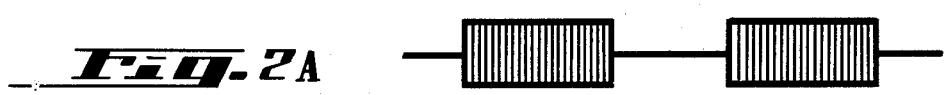
FIGS. 2A to 2E are views of waveforms appearing at the respective parts of the circuit shown in FIG. 1.
Figure 2B:
Figure 2C:
Figure 2D:

With the above circuit arrangement, let it be assumed that the function switch 82 is closed and an RF carrier signal such as shown in FIG. 2A is transmitted from the opposite station. In this case, since the IF amplifier 3 is fed with the voltage for reverse AGC, an AGC level shift signal $Sb$ of rectangular-shape as shown in FIG. 2B, which has high levels corresponding to the presence of a signal from the opposite station, is obtained at the connection point between the primary winding of the transformer 32 and the resistor 33. The signal $Sb$ is differentiated by the capacitor 83, the resistor 84, and the input impedance of the transistor 81 to form a differentiated signal $Sc$ as shown in FIG. 2C which is applied to the base of the transistor 81 to make it nonconductive during the fall period of the signal $Sc$. Then, since the collector of the transistor 81 is connected to the capacitor 85, a audio oscillator control signal $Sd$ as shown in FIG. 2D is derived from this collector every time the opposite station terminates its transmission. Thus, the transistor 91 is applied with a biasing voltage during a time period where the signal $Sd$ is high, the oscillator circuit 90 begins to oscillate during the above time period, and the oscillator signal is supplied through a resistor 93 to the AF amplifier 6 and speaker 7. Hence, when the opposite station changes its transmitting state to the receiving state, an oscillating sound is produced from the speaker 7 for a certain period.

It is obvious to those skilled in the art that the oscillator signal injection point shown in this and the other invention embodiments is not exclusive; the signal injection may be accomplished at other points in the receiver audio chain as may be convenient.

As described above, according to the present invention, when the opposite station changes its transmitting state to the receiving state, a change-over sound is produced from the speaker to inform the principal station of the above transition, and hence the change-over from the transmitting state to the receiving state can be smoothly performed. In addition, it is not necessary to say Go-ahead, please every time the above change-over operation is performed.

Figure 2E:
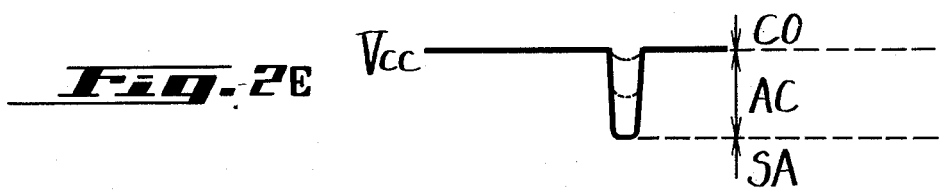

In the case when a received signal from the opposite station is high in level and hence the signal $Sb$ is high in level, the signal $Sd$ is also high. In this case, a collector-emitter voltage of the transistor 91 changes in level from the cut-off region CO through the active region AC to the saturation region SA and finally returns back through the active region AC to the cut-off region CO as shown in FIG. 2E. The oscillator circuit 90 oscillates only when the transistor 91 has its collector-emitter voltage kept in the active region AC, so that when the level of the received signal is high, the change-over sound is reproduced twice in succession. Meanwhile, when the level of the received signal is lower than the former, the level of the signal $Sd$ is also low. Accordingly, the collector-emitter voltage level of the transistor 91 remains longer in the active region AC without reaching the saturation region SA as shown in FIG. 2E by a dotted line, and hence a long change-over sound is produced. When the level of the received signal is even lower, the collector-emitter voltage of the transistor 91 keeps its level in the active region AC for a shorter period as shown in FIG. 2E by a chain line and hence a short pause sound is produced. Hence, when the received signal is high in level, the change-over sound is produced twice in succession, but as the received signal becomes lower, the change-over sound becomes continuous and shorter. As a result, the variation of the change-over sound indicates the approximate distance between the principal station and the opposite station.

The duration of the change-over sound can be changed by varying the value of the resistors 84, 92 and capacitors 83, 85. For example, in the case when the capacitor 85 is not used, since the transistor 81 is rendered conductive or nonconductive according to the signal $Sc$, the signal $Sd$ becomes rectangular in waveform and hence during a period where the signal $Sd$ is high, the transistor 91 is fed with a constant biasing voltage to make the oscillations of the oscillator circuit 90 constant. As a result, the change-over sound becomes constant during the presence of the received signal.

FIG. 3 shows a second embodiment of the transceiver according to this invention in which the IF amplifier 3 is applied with a voltage for forward AGC. In FIG. 3, elements corresponding to those of FIG. 1 are indicated by the same reference numerals with their repeated description being omitted. Additional components in this example are a resistor 94 which is connected between the resistor 93 and the variable resistor 5, and a diode 86 which is connected between the junction of the resistors 93 and 94 and the collector of the transistor 81. In addition, the transistor 81 is biased to cut off, while the transistor 91 is biased in conduction thereby causing the oscillator circuit 90 to be always oscillating.

Figure 4A:
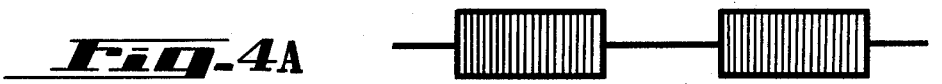
FIGS. 4A to 4D are views of waveforms appearing at the respective parts of the circuit shown in FIG. 3.
Figure 4B:
Figure 4C:
Figure 4D:
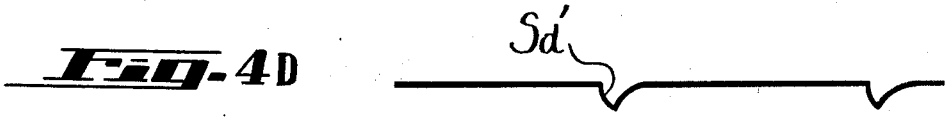

With the above circuit arrangement, when an RF carrier signal as shown in FIG. 4A is transmitted from an opposite station, since the IF amplifier 3 is supplied with the voltage for forward AGC, a signal $Sb'$ shown in FIG. 4B, which is low during a period when the signal is being transmitted, is obtained at the junction between the primary winding of the transformer 32 and the resistor 33. The signal $Sb'$ is differentiated by the capacitor 83 and the input impedance of the transistor 81 to yield a differentiated signal $Sc'$ as shown in FIG. 4C which is applied to the base of the transistor 81. Accordingly, the transistor 81 becomes conductive during a period where the signal $Sc'$ is high, and, since the collector electrode of the transistor 81 is connected to the capacitor 85, an audio oscillator control signal $Sd'$ as shown in FIG. 4D is obtained at the collector thereof every time the opposite station terminates its transmission. During a period when the signal $Sd'$ is high, the diode 86 is forwardly biased in conduction so that the constant oscillating signal from the oscillator circuit 90 is by-passed through the diode 86 to ground, thus nullifying the signal. Meanwhile, during the period when the signal S$d'$ is low, the diode 86 is reverse biased in cut off. As a result, the oscillating signal from the oscillator circuit 90 is supplied through the resistors 93 and 94 and further through the amplifier 6 to the speaker 7 without being by-passed through the diode 86. Therefore, when the opposite station terminates its transmission, a change-over sound for instructing the transition is produced from the speaker 7.

Figure 5:
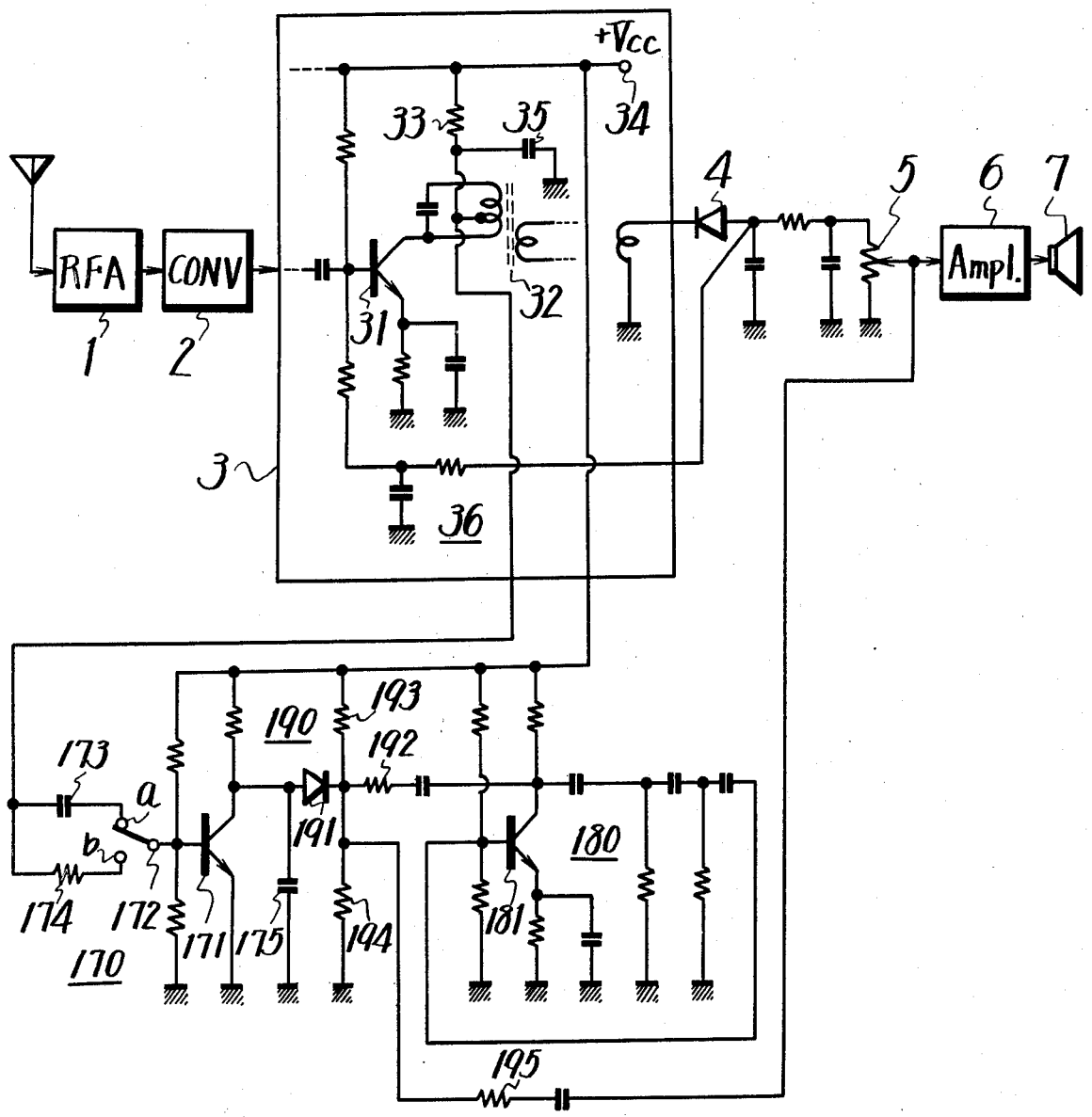
FIG. 5 is a circuit diagram showing a receiver according to a third embodiment of this invention.

FIG. 5 shows a third embodiment of the transceiver according to this invention where the IF amplifier 3 is fed with a voltage for reverse AGC, the collector of the IF amplifying transistor 31 is connected through the primary winding of the IF transformer 32 and the resistor 33 to the voltage source terminal 34, and the connection point between the primary winding of the transformer 32 and the resistor 33 is grounded through the by-pass capacitor 35 and also the detected output of the diode 4 is applied to the low pass filter 36 to derive therefrom the control voltage for reverse AGC which is applied to the base of the transistor 31. The other elements corresponding to those of FIG. 1 are attached with the same reference numerals and their description will be omitted for the sake of brevity.

In this embodiment, when an opposite station is transmitting, the receiving station detects the transmission starting time point and produces a change-over sound for instructing that the opposite station has started its transmission.

The circuitry for performing the above function consists of a detector circuit 170 to detect the transmission starting time of the opposite station, an oscillator circuit 180, and a switching circuit 190 for controlling an oscillating signal from circuit 180 by a detected signal of detector circuit 170. A grounded-emitter transistor 171 has its base connected through a contact $a$ or $b$ of function switch 172 and then through a capacitor 173 or a resistor 174 to the junction between the primary winding of the transformer 32 and the resistor 33. The collector of transistor 171 is grounded through a capacitor 175 and is also connected to the collector electrode of the transistor 181 through the diode 191 and further through a resistor 192. The diode 191 is fed with a biasing voltage by resistors 193 and 194. The connection point between the diode 191 and the resistor 192 is connected through a resistor 195 to the movable contact of the variable resistor 5. In addition, the transistor 171 is always kept nonconductive during a time period when any signal is not present.

With such an arrangement, since the transistor 171 is cut off, the diode 191 is forwardly biased in the ON state. Accordingly, the oscillating signal of the oscillator circuit 180 is by-passed through the diode 191 and the capacitor 175 to ground, nullifying the oscillator signal feed to the amplifier 6.

In this embodiment, it is assumed that the function switch 172 is connected to the contact $a$ and an RF carrier signal as shown in FIG. 6A is transmitted from the opposite station. Then, since the IF amplifier 3 is fed with the voltage for reverse AGC, a rectangular signal S$b''$, which is high during the transmitting period of the opposite station as shown in FIG. 6B, is obtained at the connection point between the primary winding of the transformer 32 and the resistor 33. The signal S$b''$ is differentiated by the capacitor 173 and the input impedance of the transistor 171, so that the base of the transistor 171 has a differentiated pulse S$c''$ as shown in FIG. 6C applied to it. Accordingly, during a period where the upward pulse S$c''$ corresponding to signal initiation is present, the transistor 171 becomes conductive to produce an audio oscillator control pulse S$d''$ as shown in FIG. 6D at the collector thereof every time the opposite station starts its transmission.

Since the diode 191 is reverse biased OFF during a period when the pulse S$d''$ is low, the oscillating signal from the oscillator circuit 180 is applied through the resistors 192 and 195 and further through the amplifier 6 to the speaker 7 without being by-passed to ground. Accordingly, when the opposite station is changed-over from its receiving condition to its transmitting condition, a change-over sound is reproduced from the speaker 7 to instruct that the above transition has been carried out.

If the function switch 172 is connected to the contact $b$, during the period when the opposite station is being transmitted, the transistor 171 is kept conductive and the diode 191 remains OFF, so that the oscillating signal of the oscillator circuit 180 is continuously applied to the speaker 7 creating a continuous sound for the purpose of calling the receiving station.

According to the above embodiment of this invention, every start of transmission at the opposite station is instructed by a changeover sound at the receiving station, so that the receiving station is appropriately notified and no simultaneous transmission will occur. As described above, this embodiment is of the type where the voltage for reverse AGC is applied to the IF amplifier 3. However, in the case where the voltage for forward AGC is applied thereto, it may be sufficient to connect the emitter electrode of the transistor 31 to the connection point between the capacitor 173 and the resistor 174.

In all the embodiments described above, the transition between transmitting and receiving conditions at the opposite station is detected by utilizing the fact that the collector operating level of the transistor 31 is changed according to the AGC operation during both the periods when a signal is being received and not being received. With this invention, however, the transmitting and receiving transition at the opposite station is noted by the use of a change-over sound.

FIG. 7 shows an embodiment of a circuit used in a typical receiver with AGC information as described above. In this embodiment, an IF signal from the IF amplifier 3, which is constructed in the same manner as described above, is supplied through a function switch 282 to a full-wave rectifier circuit 289 and a rectified output therefrom is supplied through a capacitor 283 to a base of a transistor 281. In this case, the transistor 281 is always kept conductive while a transistor 291 of an oscillator circuit 290 is kept in cut-off. The rectifier circuit 289 has derived therefrom a signal S$b$ as shown in FIG. 2B in accordance with the signal of the opposite station and a differentiated signal from the signal S$b$ is applied to the base electrode of the transistor 281 to make it nonconductive only when the signal S$b$ is decreasing, so that the transistor 290 becomes conductive only during this period to start its oscillation. Accordingly, when the opposite station is varied from its transmitting state to its receiving state, a brief change-over sound is produced from the speaker 7 to instruct that the above transition operation has been carried out. There is no need to say Go-ahead, please at every change-over time.

It will be apparent that many modifications and variations may be effected without departing from the scope of the novel concepts of this invention.

We claim as our invention:

1. A change-over notification system adapted for emitting a tone from a receiver in response to the change-over of an RF carrier signal induced in the receiver from an opposite station, comprising:
    a. a receiver IF amplifier;
    b. a receiver detector connected to an output of said IF amplifier;
    c. an AGC path from said receiver detector to said IF amplifier for causing an AGC level shift signal in said IF amplifier in response to a presence of the RF carrier signal;
    d. a receiver AF amplifier connected to an output of said detector;
    e. a change-over detector circuit means connected to said IF amplifier for detecting the change-over of the RF carrier by sensing the IF amplifier AGC level shift signal and for providing an audio oscillator control signal; and
    f. an audio oscillator means connected to said change-over detector circuit means and said receiver AF amplifier, said audio oscillator means oscillating in response to said audio oscillator control signal.

2. A change-over notification system according to claim 1 in which said change-over detector circuit means comprises differentiation and integration means for providing an audio oscillator control signal initiated by a termination change-over of the RF carrier signal.

3. A change-over notification system according to claim 1 in which said change-over detector circuit means comprises differentiation, integration, and diode means for providing an audio oscillator control signal initiated by an initiation change-over of the RF carrier signal, said control signal having a time duration less than the time of presence of the RF carrier signal.

4. A change-over notification system according to claim 1 in which said change-over detector circuit means comprises a resistor means and diode means for providing an audio oscillator control signal initiated by an initiation change-over of the RF carrier signal, said control signal having a time duration at least equal to the time of presence of the RF carrier signal.

5. A change-over notification system comprising:
    a. a receiver IF amplifier having an AGC level output;
    b. a receiver detector connected to an output of said IF amplifier;
    c. a reverse AGC path from said receiver detector to said IF amplifier;
    d. a receiver AF amplifier connected to an output of said detector;
    e. a differentiation means connected to said AGC level output;
    f. switching means having an input connected to said differentiation means;
    g. integration means connected to an output of said switching means;
    h. an audio oscillator having an output connected to said AF amplifier; and
    i. coupling means between said oscillator and said integration means.

6. The change-over notification system of claim 5 in which said coupling means comprises a resistor.

7. The change-over notification system of claim 5 in which said coupling means comprises a diode.

8. A method of creating an audio tone in a receiver in response to a change-over of an RF carrier signal induced in the receiver by an opposite station, comprising the steps of:
    a. detecting the RF carrier signal in a detector of the receiver;
    b. creating a reverse AGC signal by filtering the detected RF carrier signal;
    c. applying said reverse AGC signal to the input of an IF amplifier of the receiver;
    d. applying an AGC level shift signal at an output of said IF amplifier to a change-over detector circuit;
    e. detecting a change-over of said RF carrier signal by detecting a change in said AGC level shift signal and creating an audio oscillator control signal in response to said detecting;
    f. controlling an audio oscillator to produce an audio tone signal in response to said audio oscillator control signal; and
    g. applying said audio tone signal to an audio amplifier and speaker of the receiver.

9. The method of claim 8 in which the step of detecting a change-over further comprises the substeps of:
    a. differentiating the AGC level shift signal to create a differentiated signal;
    b. applying the differentiated signal to a switching device; and
    c. integrating an output of the switching device to create an integrated signal.

10. The method of claim 9 comprising the further sub-step of applying the integrated signal to a diode having a predetermined bias.

* * * * *